US008811945B2

(12) United States Patent
Choi et al.

(10) Patent No.: US 8,811,945 B2
(45) Date of Patent: Aug. 19, 2014

(54) AUTHENTICATION FOR SERVICE SERVER IN WIRELESS INTERNET AND SETTLEMENT USING THE SAME

(75) Inventors: Jun-Won Choi, Gyeonggi-Do (KR); Joo-Mun Lee, Gyeonggi-do (KR); Sang-Yun Lee, Gyeonggi-Do (KR); Myung-Sung Lee, Seoul (KR); Jae-Boo Chung, Gyeonggi-Do (KR)

(73) Assignee: SK Telecom Co. Ltd., Seoul (KR)

( * ) Notice: Subject to any disclaimer, the term of this patent is extended or adjusted under 35 U.S.C. 154(b) by 1176 days.

(21) Appl. No.: 12/093,477

(22) PCT Filed: Oct. 11, 2006

(86) PCT No.: PCT/KR2006/004091
§ 371 (c)(1),
(2), (4) Date: Oct. 30, 2008

(87) PCT Pub. No.: WO2007/055474
PCT Pub. Date: May 18, 2007

(65) Prior Publication Data
US 2009/0081992 A1    Mar. 26, 2009

(30) Foreign Application Priority Data

Nov. 14, 2005   (KR) .......................... 10-2005-0108412

(51) Int. Cl.
*H04M 1/66*     (2006.01)
*H04M 1/68*     (2006.01)
*H04M 3/16*     (2006.01)
*H04L 12/66*    (2006.01)

(52) U.S. Cl.
USPC ......................................... 455/411; 370/352

(58) Field of Classification Search
USPC ........ 455/406–408, 410–412.2, 414.2–414.3, 455/418–420; 380/278, 282; 370/229; 705/26.35, 44, 50, 52, 64–69, 76, 705/317–318, 325; 709/203; 713/168–169, 713/173, 175–176
See application file for complete search history.

(56) References Cited

U.S. PATENT DOCUMENTS 6,463,534 B1    10/2002   Geiger et al.
(Continued)

FOREIGN PATENT DOCUMENTS

| AU | 2006312456 | 5/2007 |
| EP | 1046976 A2 * | 10/2000 |
| EP | 1278333 | 1/2003 |
| EP | 1278333 A1 * | 1/2003 |
| EP | 1 278 333 | 2/2006 |
| JP | 2001-117873 | 4/2001 |
| KR | 2002-0061084 | 7/2002 |

(Continued)

*Primary Examiner* — Kent Chang
*Assistant Examiner* — Nathan Brittingham
(74) *Attorney, Agent, or Firm* — Baker Hostetler LLP

(57) ABSTRACT

The present invention is to provide individual and payment information to a service server by recognizing whether the service server is to be trusted when individual identification information provided by a user is received from the service server. So, the invention provides an authentication method of the service server and a payment method by using the same, which can prevent the individual identification information and payment from being accessed by a distrusted server in wireless Internet. This present comprises acts of: storing individual identification information provided from a user in an authentication server; authenticating the service server when request of the stored individual identification information is received from the service server, and transmitting the stored individual identification information to the service server when the authentication has succeeded; transmitting a message of requesting a service access to a mobile terminal of the user from the service server; and transmitting the individual identification information sent from the authentication server to the mobile terminal by means of a transmitting query of the individual identification information from the mobile terminal.

6 Claims, 3 Drawing Sheets

(56) References Cited

U.S. PATENT DOCUMENTS

| | | | |
|---|---|---|---|
| 7,610,040 B2 * | 10/2009 | Cantini et al. | 455/410 |
| 7,707,108 B2 * | 4/2010 | Brown et al. | 705/40 |
| 7,778,934 B2 * | 8/2010 | Graves et al. | 705/67 |
| 2002/0019828 A1 * | 2/2002 | Mortl | 707/200 |
| 2003/0090998 A1 | 5/2003 | Lee et al. | |
| 2005/0228782 A1 * | 10/2005 | Bronstein et al. | 707/3 |

FOREIGN PATENT DOCUMENTS

| | | |
|---|---|---|
| NZ | 564908 | 5/2007 |
| PH | 12008501126 | 5/2007 |
| WO | 2004-102338 | 11/2004 |
| WO | 2004-107285 | 12/2004 |
| WO | 2007/055474 | 5/2007 |
| WO | WO 2007/055474 A1 | 5/2007 |

* cited by examiner

AUTHENTICATION FOR SERVICE SERVER IN WIRELESS INTERNET AND SETTLEMENT USING THE SAME

TECHNICAL FIELD

The present invention is related to a method for authenticating a service server and a payment method using the same in wireless Internet, and in particular to the method of curbing the theft of individual and financial information non-trusted server in the wireless Internet by providing the individual and payment information to a service server which becomes a trustworthy server when individual identification information which is provided by a user is sent from the service server.

BACKGROUND ART

Recently, a new economic paradigm called electronic commerce has been created based on development of information communication technology and based on the Internet, the worldwide computer network. New company/business culture such as cyber business, cyber market, and cyber trade has been created and is no longer being restricted by time and location, creating an environment ready for realizing electronic business.

These days, the technical reason why the electronic commerce has attracted public attention is as follows:

The advent of the web (World Wide Web) and browsers means that computer network technology and information communication technology are being developed. It is possible to imitate various activities of actual life according to development of the computer network and information communication technology.

On the economical side, the cost of commerce is reduced and it is easy to develop a new market when industries are changing to electronic commerce.

The Internet is connected worldwide and is used by thousands of users, so the Internet is regarded a main stage of electronic commerce. Most electronic commercial transaction system are connected to a client terminal, an authentication agency, a payment system, and a store system, and can execute electronic commerce based on the Internet.

Electronic commerce is constructed using cryptographic protocol prescribed between the client terminal, the store system, and the payment system based on any other authentication means or an electronic certificate issued by the authentication agency through a previous authentication process for safe electronic commerce. The authentication agency issues, changes, and cancels the electronic certificate for confirming and proving a person concerned with the business, and authenticates a public key which the person will use. The client terminal mounts a web browser, and executes the payment by selecting one of the payment means, such as a credit card, a debit card, a transfer account, electronic money, etc. The payment system treats information of payment demanded by a store system and is called a payment broker or a payment gateway according to the payment means and type of treatment. The store system is a shopping mall where visible and invisible goods are sold to customers electronically. The store system executes an actual commercial transaction such as sales management, customer management, shop management, etc. based on a goods information database.

Phishing is a new Internet crime behavior using a junk mail, and in particular is a crime related to extracting and using the individual information of a receiver by using a mail which dose not inform of the sender's identity. One type of the Phishing involves transmitting an e-mail under the assumed name of a financial agency over the Internet and requesting an original account, a password, or other private information on the pretext of problem with a credit card or an account. Another type of the Phishing requests the private information, a telephone number, or credit card information on the pretext that a gift will be provided through an event, a research, etc.

The word Phishing comes from fishing, and Phishing and fishing are similarly pronounced. Phishing is an expression suggestive of catching a user with junk mail in an ocean of information, the Internet. Phishing can involves making a special spurious site and cheating the user out of financial information such as credit card numbers by requiring log-in or payment with a credit card. The individual information includes various IDs (Identifications) and passwords, so the financial fraud and the damage caused thereby are generated by obtaining the payment information such as credit card information.

The damage caused by phishing can be generated in wireless Internet. In particular, a non-special site can disguise itself as a special site to the users according to the opening of the network and transmits a call back URL (Uniform Resource Locators) message to the mobile terminal of the user, wherein a non-special site means a site which does not authenticate by mobile communication company. Financial fraud like phishing can be generated when the non-special site requests the payment information. Anyone can easily access to the wireless network using the call back URL according to the opening of the wireless network, but the user can not determine whether the server is a trustworthy server when the user accesses to the wireless network, so hacking by phishing can be executes easily.

It is difficult for the user of the mobile terminal to determine whether to trust the site because the URL of the wireless site visited by the user does not appear on a display of the mobile terminal as it does in a browser of a computer. The information provided is restricted in a mark-up page (WML, cHTML, etc.) which is implemented by a wireless Internet portal compared with a mark-up page (HTML) which is implemented by a wire Internet portal by limitation of the data transmit speed in the mobile terminal and the wireless Internet. Therefore, there is a high possibility that the individual information and private payment information can be extracted from the mobile terminal by disguising as a special site.

DISCLOSURE OF INVENTION

Technical Problem

The present invention aims at solving the problems described above, and an object of the invention is to provide individual and payment information to a service server by recognizing the service server to be trusted when individual identification information provided by a user is received from the service server. So, the invention provides an authentication method of the service server and a payment method using the same, which can prevent the individual and payment information from being extracted be a distrusted server in wireless Internet.

Technical Solution

A method for authenticating a service server in wireless Internet according to the first aspect of the present invention comprises steps of: storing individual identification information provided by a user in an authentication server; authenticating the service server when the service server requests the stored individual identification information, and transmitting the stored individual identification information to the service server when the service server is authenticated; transmitting a message of requesting service access to a mobile terminal of the user from the service server; and transmitting the individual identification information sent from the authentication server to the mobile terminal in response to a request of transmitting the individual identification information from the mobile terminal.

A method for authenticating a service server in wireless Internet according to the second aspect of the present invention comprises steps of: storing individual identification information provided from a user in an authentication server; authenticating the service server when the service server requests the stored individual identification information, and transmitting the stored individual identification information to the service server when the service server is authenticated; transmitting a message of requesting service access including the individual identification information which is received by the authentication server to the mobile terminal of the user from the service server.

A method for paying in a wireless Internet according to the third aspect of the present invention comprising steps of: a) storing individual identification information provided by a user in an authentication server; b) requesting the individual identification information of the user to the authentication server when a payment server receives a phone number of the mobile terminal of the user and payment information from a terminal of a participating store; c) transmitting the stored individual identification information to the payment server when the payment server is authenticated by the authentication server; d) transmitting the individual identification information sent from the authentication server to the mobile terminal of the user from the payment server; and e) receiving the payment information from the mobile terminal when the mobile terminal transmits an approval response to the payment server, and transmitting a payment approval result caused by the authentication of the user to the terminal of the participating store.

A method for paying in a wireless Internet according to the fourth aspect of the present invention comprising steps of: a) temporarily storing individual identification information when an authentication server receives a phone number of the mobile terminal of a user, payment information, and the individual identification information from a participating stores, and transmitting the phone number of the mobile terminal and the payment information to a payment server; b) requesting the individual identification information of the user to the authentication server when the payment server receives the phone number of the mobile terminal and the payment information; c) transmitting the stored individual identification information to the payment server when the payment server is authenticated by the authentication server; d) transmitting the individual identification information which is received from the authentication server to the mobile terminal of the user from the payment server; and e) receiving the payment information from the mobile terminal when the mobile terminal transmits an approval response to the payment server, and transmitting the payment approval result caused by the authentication of the user to the terminal of the participating store.

Advantageous Effects

According to the present invention, a mobile terminal payment service is safely provided, and generation of phishing fraud and damage thereby are prevented in advance by providing payment information such as individual information, etc. when a user of the mobile terminal receives the user is own individual identification information from a server via wireless Internet and confirms the server as trusted.

BEST MODE FOR CARRYING OUT THE INVENTION

In explaining a method of downloading a multimedia message to a receiving terminal according to the present invention as follows, we will omit the explanation about techniques known to those skilled in the art, which is not related to the present invention. And the following detailed description according to the present invention is illustrated by way of only one example. It is obvious that a person skilled in the art could easily make changes according to the present invention.

Referring to the attached drawings, the preferred embodiment according to the invention will be explained.

Figure 1:
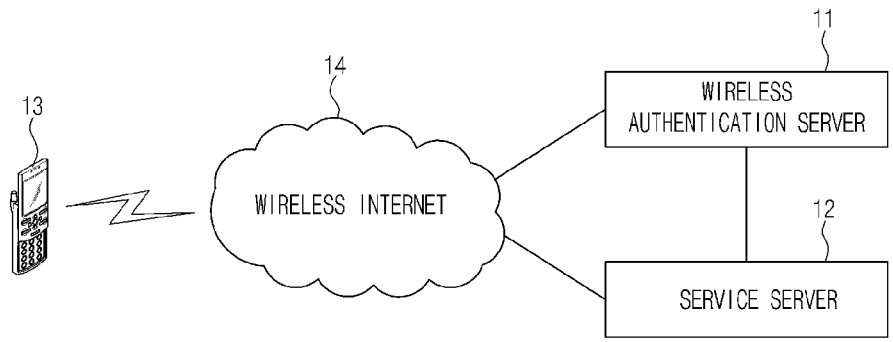
FIG. 1 shows a diagram of a network for authenticating a service server in a wireless network according to the present invention.

FIG. 1 shows a diagram of network for authenticating a service server in wireless network according to the present invention.

In this invention, a wireless authentication server 11 connected to a wireless Internet 14 is used for a service server 11. The wireless authentication server 11 receives and stores individual identification information from a mobile terminal 13 of a user. The individual identification information includes audio information, movie information, or an image such as a password, a special message, a picture, etc. Also, the individual identification information is transmitted to the wireless authentication server 11 in advance, and then the wireless authentication server 11 can be matched to a phone number of the mobile terminal and stored. A method of transmitting the individual identification information to the wireless authentication server 11 from the mobile terminal 13 is known in the art. For example, when the mobile terminal 13 accesses the wireless authentication server 11 via wireless internet and inputs the individual identification information such as a password, a message, an image, etc. to the wireless authentication server 11, the individual identification information corresponding to phone number of the mobile terminal is stored in the wireless authentication server 11. In another method, the individual identification information such as the password, audio, etc., inputted by using ARS corresponds to the phone number of the mobile terminal and is stored in the wireless authentication server 11. As known to those skilled in the art, there are various methods for transmitting the individual identification information to the wireless identification server 11, so that the additional explain is omitted.

The wireless authentication server 11 sends the individual identification information of the user to the service server 12 according to the request of the service server 12. The wireless authentication server 11 confirms whether the service server 12 is a trusted server or not by authenticating the service server 12 which requests the individual identification information, and then transmits the requested individual identification information.

For methods of authenticating between the wireless authentication server 11 and the service server 12 there are two following examples. Firstly, the service server 12 is registered to the wireless authentication server 11 in advance. In this case, the service server 12 inputs access URL information including an IP address or a domain name in advance and the network authenticates the access URL. Secondly, both servers mutually authenticate by using an electronic signature base on a certificate. For using the certificate, the service server 11 installs the certificate issued by a Certificate Authority approved officially and then authenticates by using the certificate.

The service server 12 may be a server which provides goods or information such as contents etc., or a payment server that executes electronic payments as proxy. The service server 12 obtains the phone number of the mobile terminal which uses the service, and then requests the individual identification information corresponding to the number to the wireless authentication server 11. The service server 12 transmits a message of requesting access to the mobile terminal 13. When the mobile terminal 13 connects to the service server 12, the service server 12 transmits the individual identification information obtained from the wireless authentication server 11 to the mobile terminal 13. The user of the mobile terminal confirms whether the service server 12 is trusted through the individual identification information transmitted from the service server 12. The message of requesting access which the service server 12 sends to the mobile terminal 13, has at least one type among a SMS(Short Message Service) message, multimedia (MMS; Multimedia Message Service) message, or WAP push message. The SMS message includes the URL information or the number of the ARS system for a telephony connection. When the individual identification information is stored in the mobile terminal of the user, the mobile terminal can transmits the call back SMS message, the MMS message, or a WAP push message which respectively includes the individual identification information. For example, if the individual identification information is stored in an IC chip embedded into the mobile terminal, the mobile terminal transmits the message including the individual identification information. Also, the mobile terminal can determine whether to connect in advance by extracting and comparing the individual identification information from the message.

Figure 2:
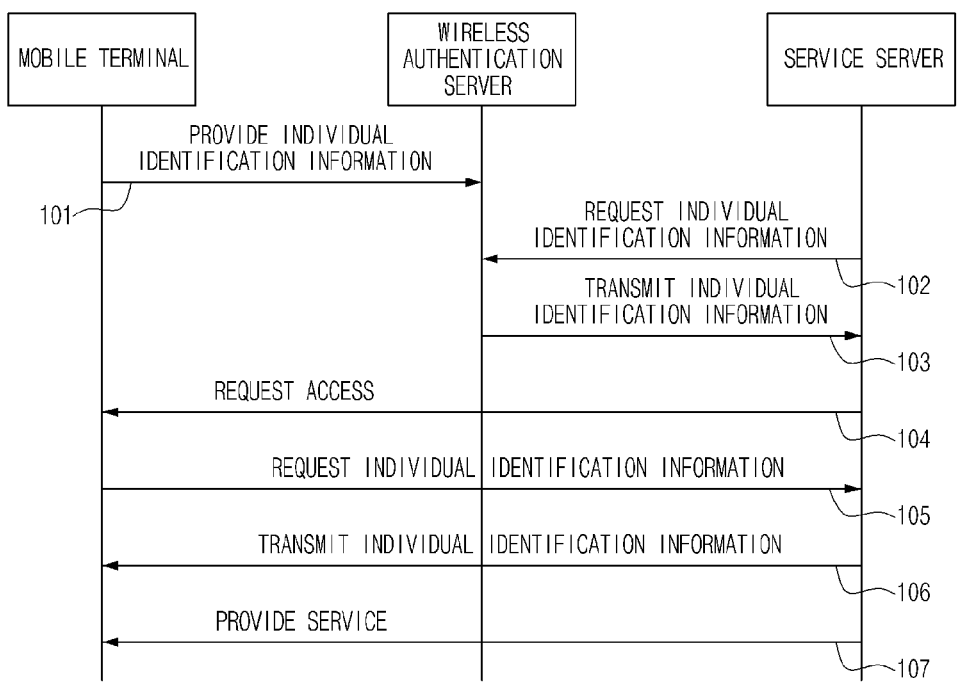
FIG. 2 is a flow diagram for explaining a method for authenticating a service server according to the present invention.

FIG. 2 illustrates a method for authenticating a service server when individual identification information is previously registered in a wireless authentication server according to an embodiment of the present invention.

In advance, a user accesses a wireless authentication server by using a mobile terminal or other terminal, and stores a phone number of the mobile terminal with individual identification information which will be used (step 101).

A service server obtains the phone number of the mobile terminal to provide a service, and then requests the individual identification information corresponding to the acquired phone number of the mobile terminal to the wireless authentication server. The wireless authentication server authenticates the service server which requests the individual identification information, and transmits the requested individual identification information of the user to the service server after verifying the service server as trusted (step 103).

When the service server receives the individual identification information, the service server transmits a message of requesting access to the mobile terminal of the user (step 104). The user of the mobile terminal which receives the message of requesting access confirms the information of the service server which requests access and then connects to the service server. Simultaneously, the user of the mobile terminal asks the individual identification information himself/herself to the service server (step 105).

The service server transmits the individual identification information acquired from the wireless authentication server to the mobile terminal (step 106). The user of the mobile terminal confirms the transmitted individual identification information and determines whether to execute the next service process continuously. When the individual identification information transmitted from the service server is identical to his/her own individual identification information, the service server is considered to be a trusted service server, so that the user is able to carry out the next service process for buying and paying. However, when the individual identification information transmitted from the service server is not identical to his/her own individual identification information, the service server is considered to be a distrusted service server, so that the mobile terminal preferably disconnects to the service server.

Although FIG. 2 illustrates a method for requesting the individual identification information after connecting between the mobile terminal and the service server, when the individual identification information is stored in the mobile terminal, the service server can transmit the message of requesting access with the individual identification information. In this case, the user of the mobile terminal determines whether to connect by confirming the individual identification information before connecting to the service server.

When the user of the mobile terminal identifies the service server as a trusted service server and connects to the service server, the service server confirms whether the user is normal or not by authenticating the user of the mobile terminal, and the service server sells a service or goods and performs a payment processing which is equal to the published technology. It is prior art that the mobile terminal connects to the service server, and buys goods and pays, so that the present invention does not include a detailed explanation thereof.

Figure 3:
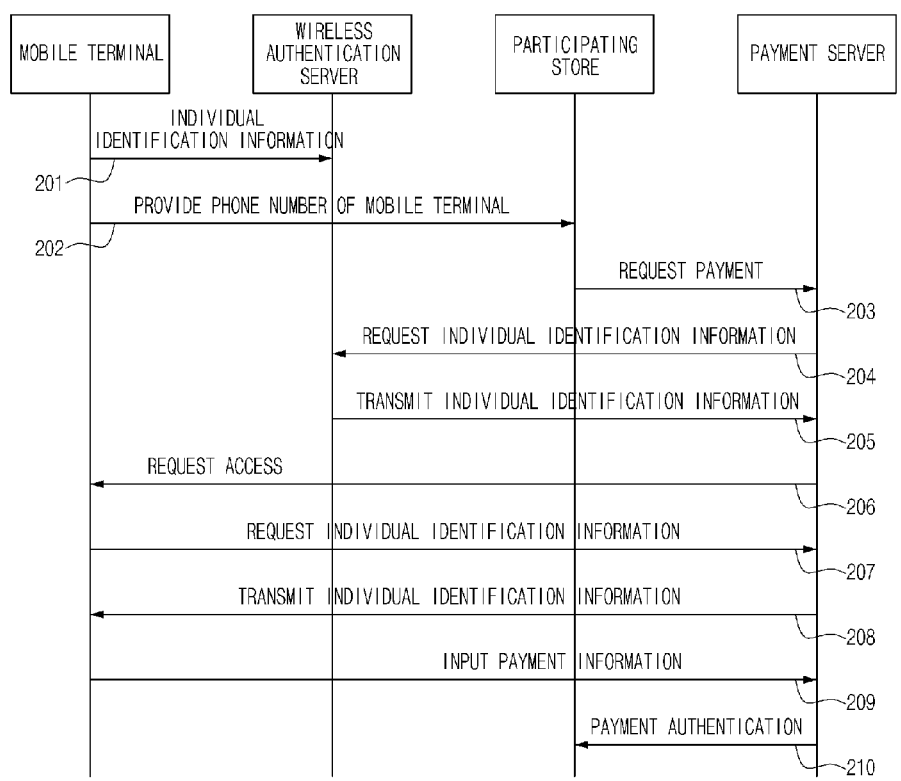
FIG. 3 is a flow diagram for explaining the electronic payment processing according to one embodiment of the present invention.

FIG. 3 is a flow diagram for explaining the electronic payment processing according to one embodiment of the present invention.

The wireless authentication server stores the individual identification information which is sent from a mobile terminal with the number thereof (step 201). A buyer provides the phone number of the mobile terminal to a participating store for payment processing after buying goods (step 202). The participating store is a shopping mall server of electronic commerce or a terminal of an off-line store. The terminal of the participating store connects to a payment server and transmits a payment request message including the phone number of the mobile terminal and the payment information, etc.

The payment server which receives the payment request message transmits the phone number of the mobile terminal of the buyer to the wireless authentication server so that the payment server requests the individual identification information (step 204). The wireless authentication server authenticates and verifies as trusted the payment server which requests the individual identification information. When the payment server is deemed to be trusted according to the verified results, the wireless authentication server searches the individual identification information which is requested by the wireless authentication server, and transmits the individual identification information to the payment server (step 205).

The payment server which receives the individual identification information transmits the message of requesting access to the mobile terminal of the buyer (step 206). The buyer receives the message of requesting access and confirms payment amount, and information of the payment server which request to access, etc., and then the buyer connects to the payment server and simultaneously requests his/her own individual identification information from the payment server (step 207).

The payment server transmits the individual identification information of the buyer, which is received from the wireless authentication server, to the mobile terminal of the buyer (step 208). The buyer receives and confirms the transmitted individual identification information so that the buyer determines whether to execute the next payment processing step continuously or not. When the individual identification information transmitted by the payment server is identical to the buyer is own individual identification information, the buyer executes the payment according to the normal process (step 209). In the payment processing, the payment server executes the authentication process by confirming the buyer and executes the payment by receiving information for the payment. And the payment server sends the payment result to the participating store (step 210).

Although FIG. 3 illustrates a method for requesting the individual identification information to the payment server after connecting between the mobile terminal and the payment server, when the individual identification information is stored in the mobile terminal, the payment server can transmit the message of requesting access with the individual identification information. In this case, the user of the mobile terminal determines whether to connect by confirming the individual identification information before connecting to the payment server. Also, the payment server can transmit the message of requesting access with information of the participating stores and the payment amount, etc. to the mobile terminal.

Figure 4:
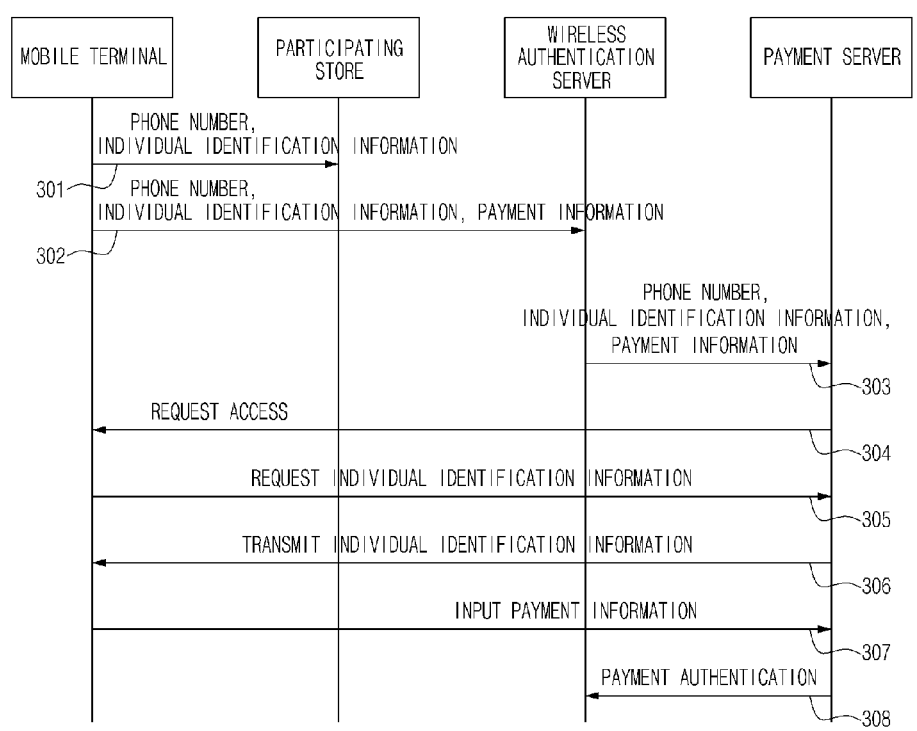
FIG. 4 is a flow diagram for explaining the electronic payment processing according to another embodiment of the present invention.

FIG. 4 is a flow diagram for explaining the electronic payment processing according to another embodiment of the present invention.

The buyer provides a phone number of the mobile terminal and individual identification information to a participating store for buying a service or goods and paying (step 301). A terminal of the participating store sends the phone number of the mobile terminal, the individual identification information, and the payment information to a wireless authentication server (step 302). The wireless authentication server transmits the phone number of the buyer, the individual identification information, and the payment information which is sent from the participating store to the payment server (step 303). In this process, the wireless authentication server authenticates the payment server as follows.

Firstly, the wireless authentication server receives the phone number of the mobile terminal, the individual identification information, and the payment information. Then, the wireless authentication server matches the individual identification information with the phone number of the mobile terminal, and temporarily stores the individual identification information corresponding to the phone number of the mobile terminal, and transmits only the phone number of the mobile terminal and the payment information to the payment server. When the payment server requests the individual identification information to the wireless authentication server, the wireless authentication server sends the individual identification information to the payment server after authenticating the payment server.

Secondly, the wireless authentication server requests information for mutually authenticating between the payment server and the wireless authentication server, after temporarily storing the phone number of the mobile terminal, the individual identification information, and the payment information transmitted from the terminal of the participating store. When the authentication has succeeded, the wireless authentication server transmits the phone number of the mobile terminal, the individual identification information, and the payment information transmitted from the terminal of the participating store to the payment server.

The payment server which receives the phone number of the mobile terminal, the individual identification information, and the payment information from the wireless authentication server transmits a message of requesting access to the mobile terminal of the buyer (step 304). The buyer who receives the message of requesting access confirms the payment amount and the payment server which requests the access and then connects and requests the buyer's own individual identification information to the payment server in the same time (step 305).

The payment server transmits the individual identification information of the buyer to the mobile terminal of the buyer (step 306), and the buyer confirms the received individual identification information so that the buyer determines whether to execute the next payment processing step continuously or not. The buyer executes the payment according to a normal processing when the individual identification information transmitted from the payment server is identical to the buyer's own individual identification information (step 307). In the payment processing, the payment server authenticates the buyer and executes the payment processing with the input information for the payment. And the payment server sends the payment result to the participating store (step 308).

Although FIG. 4 illustrates a method for requesting the individual identification information to the payment server after connecting between the mobile terminal and the payment server, when the individual identification information is stored in the mobile terminal, the payment server can transmit the message of requesting access with the individual identification information. In this case, the user of the mobile terminal determines whether to connect by confirming the individual identification information before connecting to the payment server. Also, the payment server can transmit the message of requesting access with information of the participating stores and the payment amount, etc. to the mobile terminal.

The invention claimed is:

1. A method for approving a payment transaction for the purchase of goods by a user having a mobile terminal through a service or payment server pursuant to which payment information is provided over the wireless Internet with the payment information being utilized for confirmation and approval of the payment transaction before the payment is made, comprising the steps of:
    providing the store location from which the goods are purchased with the mobile number of the user with the store location having a terminal connected to the service or payment server;
    storing individual identification information of the user in an authentication server, with the user having a mobile terminal from which payment information inclusive of individual identification information of the user is transmitted to the authentication server with a number corresponding to the mobile terminal of the user;

transmitting a payment request from the terminal of the store location to the service or payment server;

using the service or payment server to request said individual identification information from the authentication server;

using the authentication server to authenticate the service server upon request by the service server for the stored individual identification information provided to the mobile terminal by the user;

transmitting the stored individual identification information to the service server when the service server is authenticated;

transmitting a message requesting service access to said mobile terminal of the user from the service server, and transmitting the individual identification information sent from the authentication server to the mobile terminal in response to a request of transmitting the individual identification information from the mobile terminal for the user to personally confirm that the individual identification information transmitted to the mobile terminal is identical to the users individual identification information;

upon personal confirmation by the user, that the transmitted individual identification information is the same as the user's individual identification information and the payment information is correct, the user approves the payment transaction; and transmitting an approved response to the service or payment server.

2. A method for approving a payment transaction for the purchase of goods by a user having a mobile terminal through a service or payment server pursuant to which payment information is provided over the wireless Internet with the payment information being utilized for confirmation and approval of the payment transaction before the payment is made, comprising the steps of:

transmitting payment information inclusive of individual identification information of a user via a mobile terminal of the user to an authentication server;

using the authentication server to authenticate the service or payment server upon request by the service or payment server for the stored individual identification information provided to the authentication server, with said individual identification information comprising the mobile number of the user;

transmitting the stored individual identification information to the service or payment server after the service or payment server is authenticated;

transmitting a message to the mobile terminal of the user requesting the user to personally confirm that the individual identification information transmitted to the to the service or payment server is identical to the users individual identification information;

upon personal confirmation by the user, that the transmitted individual identification information is the same as the user's individual identification information and the payment information is correct, the user approves the payment transaction; and transmitting an approved response to the service or payment server.

3. The method as claimed in claim 1 or 2, wherein the step of authenticating the service server comprising the step of confirming whether information of the service server is registered on the authentication server.

4. The method as claimed in claim 1 or 2, wherein the step of authenticating the service server comprising the step of confirming a certification of an electronic signature in the authentication server.

5. The method as claimed in claim 1 or 2, wherein the individual identification information includes at least one of a text, an image, a voice, a picture, and a password.

6. The method as claimed in claim 1 or 2, wherein the individual identification information which is included in a SMS message, a MMS message, or WAP push message is transmitted to the mobile terminal.

* * * * *